(12) United States Patent
Yen et al.

(10) Patent No.: US 11,394,361 B2
(45) Date of Patent: Jul. 19, 2022

(54) BUK ACOUSTIC WAVE RESONATOR WITH GUARD RINGS HAVING RECESSED SPACE FROM ELECTRODE EDGE AND PERIODIC DESIGNS

(71) Applicant: Texas Instruments Incorporated, Dallas, TX (US)

(72) Inventors: Ting-Ta Yen, San Jose, CA (US); Brian Goodlin, Plano, TX (US); Ricky Alan Jackson, Richardson, TX (US); Nicholas Stephen Dellas, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 816 days.

(21) Appl. No.: 16/284,831

(22) Filed: Feb. 25, 2019

(65) Prior Publication Data
US 2020/0274514 A1 Aug. 27, 2020

(51) Int. Cl.
*H03H 9/02* (2006.01)
*H03H 3/02* (2006.01)
*H03H 9/17* (2006.01)
*H03H 9/13* (2006.01)
(Continued)

(52) U.S. Cl.
CPC ......... *H03H 9/02086* (2013.01); *G06F 30/23* (2020.01); *H03H 3/02* (2013.01); *H03H 9/02157* (2013.01); *H03H 9/132* (2013.01); *H03H 9/175* (2013.01); *G06F 2111/20* (2020.01); *H03H 2003/027* (2013.01); *H03H 2003/028* (2013.01)

(58) Field of Classification Search
CPC .......... H03H 9/02086; H03H 9/02157; H03H 9/132; H03H 9/175; H03H 9/0211; H03H 9/02118; H03H 9/0547; H03H 9/1007; H03H 9/173; H03H 3/02; H03H 2003/027; H03H 2003/028; G06F 30/23; G06F 30/20; G06F 30/36
See application file for complete search history.

(56) References Cited

U.S. PATENT DOCUMENTS 5,373,268 A 12/1994 Dworsky et al.
6,087,198 A 7/2000 Panasik
6,548,942 B1 4/2003 Panasik
(Continued)

OTHER PUBLICATIONS

Remco Strijbos et al, "Design and Characterisation of High-Q Solidly-Mounted Bulk Acoustic Wave Filters", 2007 Proceedings 57th Electronic Components and Technology Conference, May 29-Jun. 1, 2007, Reno, Nevada, pp. 169-174.
(Continued)

*Primary Examiner* — Jeffrey M Shin
(74) *Attorney, Agent, or Firm* — Michael A. Davis, Jr.; Charles A. Brill; Frank D. Cimino

(57) ABSTRACT

A micromechanical system (MEMS) acoustic wave resonator is formed on a base substrate. A piezoelectric member is mounted on the base substrate. The piezoelectric member has a first electrode covering a first surface of the piezoelectric member and a second electrode covering a second surface of the piezoelectric member opposite the first electrode, the second electrode being bounded by a perimeter edge. A first guard ring is positioned on the second electrode spaced apart from the perimeter edge of the second electrode.

20 Claims, 10 Drawing Sheets

(51) Int. Cl.
    *G06F 30/23*     (2020.01)
    *G06F 111/20*     (2020.01)

(56) References Cited

U.S. PATENT DOCUMENTS

| | | | |
|---|---|---|---|
| 9,129,886 | B2 | 9/2015 | Jacobsen et al. |
| 9,503,047 | B2 | 11/2016 | Jacobsen et al. |
| 9,524,881 | B2 | 12/2016 | Jiang et al. |
| 9,525,397 | B2 * | 12/2016 | Burak .................... H03H 9/171 |
| 9,660,603 | B2 | 5/2017 | Jiang et al. |
| 9,896,330 | B2 | 2/2018 | Wachtler et al. |
| 9,929,714 | B2 | 3/2018 | Jacobsen et al. |
| 10,135,415 | B2 | 11/2018 | Soman et al. |
| 2011/0249889 | A1 | 10/2011 | Kothandaraman et al. |
| 2014/0111288 | A1 * | 4/2014 | Nikkel ............... H03H 9/02157 333/187 |
| 2017/0026029 | A1 | 1/2017 | Bahai et al. |
| 2017/0264267 | A1 * | 9/2017 | Tajic .................. H03H 9/02118 |
| 2017/0330841 | A1 | 11/2017 | Cook et al. |
| 2018/0246323 | A1 | 8/2018 | Fedigan et al. |
| 2019/0007020 | A1 | 1/2019 | Yen |
| 2019/0007023 | A1 | 1/2019 | Yen |

OTHER PUBLICATIONS

Ting-Ta Yen et al, "Bulk Acoustic Wave Resonator on a Stress Isolated Platform", TI-78499, U.S. Appl. No. 15/857,906, filed Dec. 29, 2017, pp. 1-22.

Arun Paidmarri et all, "A 0.68V 0.68mW 2.4GHz PLL for Ultra-low Power RF Systems", 2015 IEEE Radio Frequency Integrated Circuits Symposium (RFIC), May 17-19, 2015, Phoenix, AZ, pp. 1-4.

Ndrew Nelson et all, "A 22uW, 2.0GHz FBAR Oscillator", 2011 IEEE Radio Frequency Integrated Circuits Symposium (RFIC), Jun. 5-7, 2011, Baltimore, MD, pp. 1-4.

\* cited by examiner

BUK ACOUSTIC WAVE RESONATOR WITH GUARD RINGS HAVING RECESSED SPACE FROM ELECTRODE EDGE AND PERIODIC DESIGNS

FIELD OF THE DISCLOSURE

This disclosure relates to bulk acoustic wave resonators that have guard rings having recessed space from electrode edge and periodic designs.

BACKGROUND OF THE DISCLOSURE

Microelectromechanical system (MEMS) resonators are used for multiple applications, among them low-power, low-phase noise, high stability oscillators. Integrating the MEMS resonators with the integrated circuit chips in a regular semiconductor packaging is usually a challenging aspect of such devices. Multiple approaches have been used, such as: wire-bonding, flip-chip, CMOS-MEMS, etc.

A bulk acoustic wave (BAW) resonator is a MEMS device that includes a piezoelectric thin film sandwiched between two electrodes and acoustically isolated from the surrounding medium. BAW resonators using piezoelectric films with thicknesses ranging from several micrometers down to tenth of micrometers resonate in the frequency range of roughly 100 MHz to 10 GHz. Aluminum nitride and zinc oxide are two common piezoelectric materials used in MEMS acoustic wave resonators.

Several types of MEMS acoustic wave resonator-based oscillators are known, see for example: Paidimarri, Arun, Nathan Ickes, and Anantha P. Chandrakasan, "A 0.68V 0.68 mW 2.4 GHz PLL for Ultra-Low Power RF Systems." 2015 IEEE Radio Frequency Integrated Circuits Symposium (RFIC) (May 2015); A. Nelson, J. Hu, J. Kaitila, R. Ruby and B. Otis, "A 22 µW, 2.0 GHz FBAR oscillator," 2011 *IEEE Radio Frequency Integrated Circuits Symposium*, Baltimore, Md., 2011, pp. 1-4.

SUMMARY OF THE DISCLOSURE

An example of the present disclosure provides a MEMS acoustic wave resonator that is formed on a base substrate. A piezoelectric member is mounted on the base substrate. The piezoelectric member has a first electrode covering a first surface of the piezoelectric member and a second electrode covering a second surface of the piezoelectric member opposite the first electrode, the second electrode being bounded by a perimeter edge. A first guard ring is positioned on the second electrode spaced from the perimeter edge of the second electrode, wherein the first guard ring has a thickness and a width and is spaced from the perimeter edge of the second electrode by a distance.

DETAILED DESCRIPTION OF EMBODIMENTS OF THE DISCLOSURE

Figure 1:
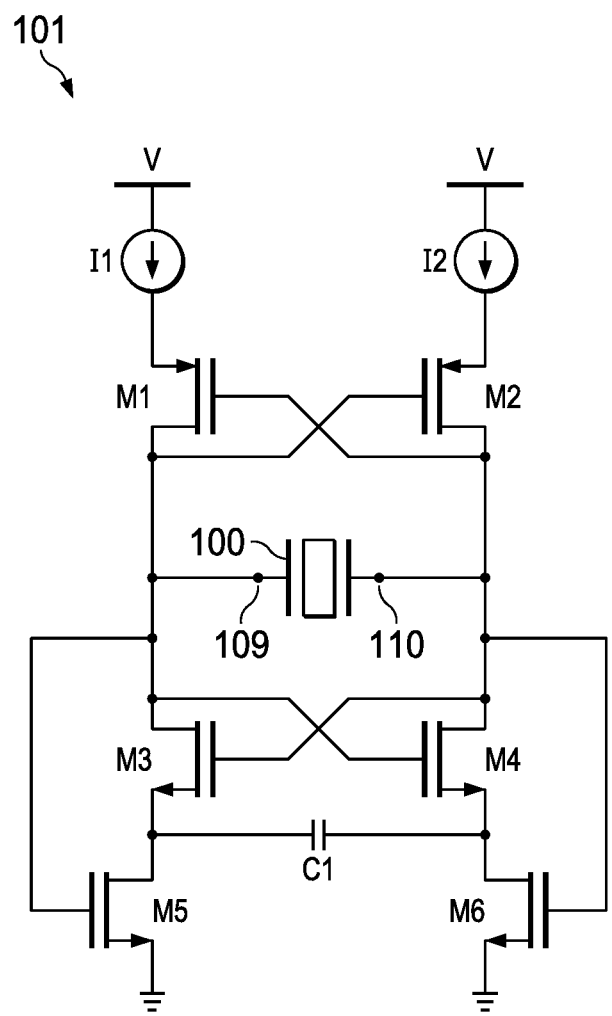
FIG. 1 is a schematic of an example oscillator circuit that includes a MEMS acoustic wave resonator device.

In the drawings, like elements are denoted by like reference numerals for consistency.

Microelectronic devices that include frequency selective components are important for many electronic products requiring stable frequency signals or ability to discriminate between signals based on frequency diversity. For resonant MEMS (microelectromechanical systems) devices, stability is important for good performance.

A MEMS bulk acoustic wave (BAW) resonator that includes one or more guard rings to create recessed space(s) will be disclosed herein. The recessed spaces allow a type 2 acoustic wave resonator device to be operated with minimal ripple around the parallel resonance frequency, fp.

FIG. 1 is a schematic of an oscillator circuit example 101 that uses a MEMS acoustic wave resonator 100 that includes one or more recessed spaces. In this example, oscillator circuit 101 is implemented on a semiconductor substrate using complimentary metal-oxide semiconductor (CMOS) transistors, for example. In this example, current sources I1, I2 provide a constant current to cross coupled differential pair PMOS transistors M1, M2 and cross coupled differential pair NMOS transistors M3, M4. MEMS acoustic wave resonator 100 acts as an L-C tank circuit. NMOS transistors M5, M6, and capacitor C1 may be needed to reduce gain at low frequencies. MEMS acoustic wave resonator 100 may look like a capacitor at low frequency, but will look like an open circuit at DC (direct current) and the circuit might actually latch without the aid of transistors M5, M6.

MEMS acoustic wave resonator 100 includes a piezoelectric material sandwiched between two electrodes and acoustically isolated from the surrounding medium. MEMS acoustic wave resonator devices using piezoelectric films with thicknesses ranging from several micrometers down to tenth of micrometers resonate in the frequency range of roughly 100 MHz to 10 GHz. Aluminum nitride and zinc oxide are two common piezoelectric materials used in MEMS acoustic wave resonators.

In this example, MEMS acoustic wave resonator 100 is implemented on a semiconductor substrate that is separate from the semiconductor substrate on which oscillator circuit 101 is fabricated. MEMS acoustic resonator 100 may be mounted on the CMOS oscillator chip. Bond wires may be used to connect MEMS resonator terminals 109, 110 to bond pads on the CMOS oscillator chip. In another example, a MEMS acoustic wave resonator similar to MEMS acoustic wave resonator 100 may be fabricated on the same substrate that includes an oscillator circuit.

Figure 2:
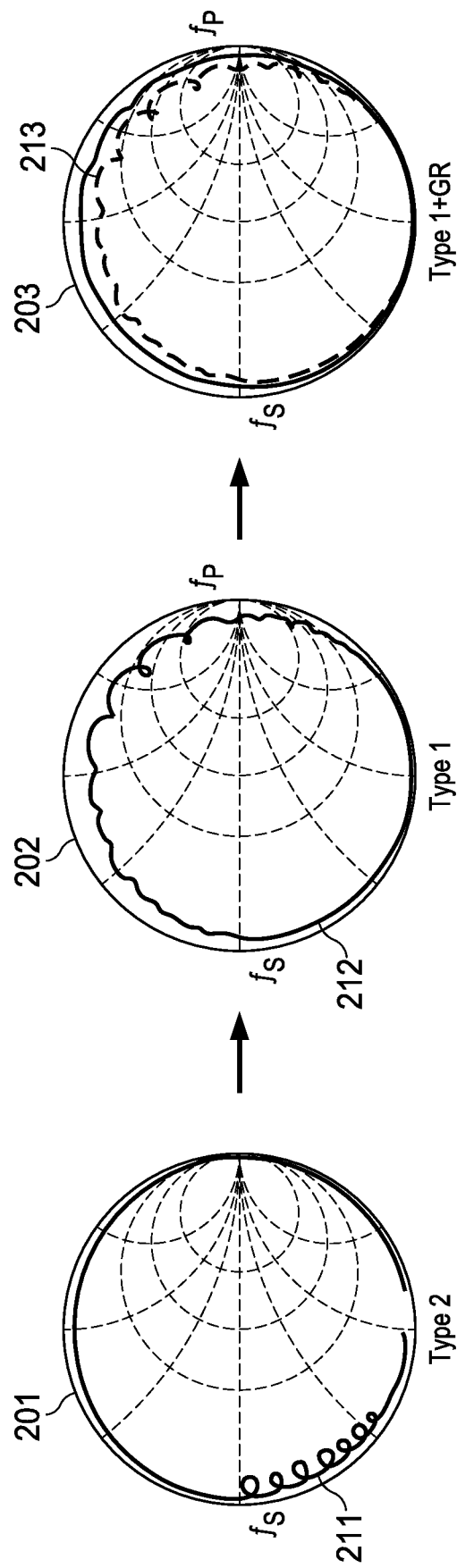
FIG. 2 is a set of Smith charts illustrating operation of a prior art MEMS acoustic wave resonator device.

FIG. 2 is a set of Smith charts illustrating operation of a typical MEMS acoustic wave resonator device. A typical MEMS acoustic wave resonator includes two electrodes positioned on opposite sides of a piezoelectric layer, similar to a capacitor. A thin Film Bulk Acoustic Resonator (FBAR) is a fully released structure and requires cavities below and above the resonator. A Solidly Mounted Resonator (SMR) uses acoustic reflectors, also referred to as "acoustic mirrors," below the bottom electrode to prevent acoustic energy from leaking to the substrate. In a BAW resonator, there exist two wave modes—thickness extensional (TE) mode and thickness shear (TS) mode. If the longitudinal cutoff frequency (fc(TE1)) (or series resonant frequency fs) is lower than the second shear wave cutoff frequency (fc (TS2)), the device is defined as a type II device. Devices whose fc(TE1) is higher than fc(TS2) are defined as a type I device.

Smith chart 201 shows the resonance responses of a typical Type II resonator. A device that uses an aluminum nitride (AlN) piezoelectric is naturally a Type II device, with spurious modes (ripples) 211 below the series resonance (fs). The thickness and spacing of the acoustic mirror below the bottom electrode may be engineered and adjusted to convert a Type II device into a Type I device as shown in Smith Chart 202 with spurious modes (ripples) 212 above fs. A guard ring may then be used to smooth these ripples as shown in Smith Chart 203. A typical guard ring is a thin layer of conductive or dielectric material that is about a quarter wavelength width that is deposited along the outer perimeter of the top electrode.

However, notice that even with a typical outer perimeter guard ring, ripples 213 still exist around the parallel resonance frequency fp. The existence of these ripples in the vicinity of parallel resonance frequency fp is undesirable in many applications. Any ripples around the parallel resonance can cause the Qp (quality factor around fp) and Zp (Impedance around fp) to vary and thus may cause variation in the system performance.

Figure 3:
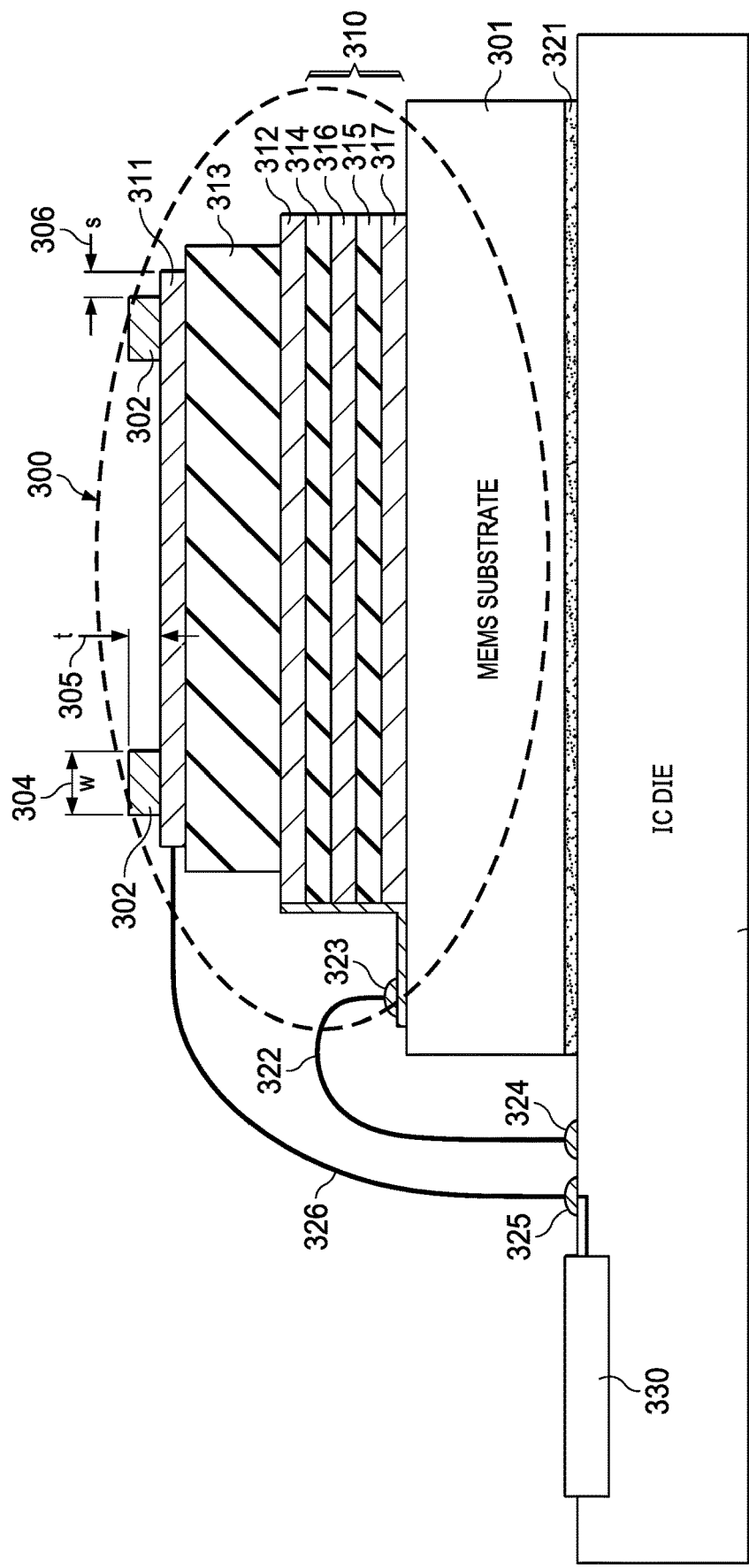
FIG. 3 is cross sectional view of an example MEMS acoustic wave resonator device having a guard ring with a recessed space to the edge of the electrode.

FIG. 3 is cross sectional view of an example MEMS resonator device 300 with a guard ring 302. By spacing guard ring 302 away from the perimeter edge of the top electrode 311 as indicated by space "s" 306, ripple and spurious modes around the parallel resonance frequency (fp) are minimized. This configuration allows a Type II BAW resonator to eliminate lateral standing Lamb waves in the active area of the resonator. When correct dimensions for width "w" 304, thickness "t" 305, and space "s" 306 are implemented, this guard ring configuration has a lower cut-off frequency to fulfill the boundary condition required to have piston mode operation. In piston mode operation, the whole active area of the BAW structure vibrates in phase to present a flat distribution of mechanical displacements across the entire active area. Resonances occurring near the piston mode operation frequency are therefore often weakly coupled, which enhances the electrical performance of the BAW resonator.

In this example, MEMS acoustic wave resonator 300 is a solidly mounted resonator (SMR) that uses an acoustic reflector 310 at the bottom to prevent acoustic energy from leaking into MEMS substrate 301. MEMS acoustic wave resonator 300 includes an upper electrode 311 and a lower electrode 312, which are separated by a piezoelectric member 313. MEMS resonator 300 may be fabricated directly on substrate 301 using known or later developed semiconductor fabrication techniques.

In this example, electrodes 311, 312 and guard ring 302 are patterned from layers of metal, such as Al, Mo, Cu, Au, etc. A piezoelectric member 313 is positioned between the top electrode 311 and the bottom electrode 312. Piezoelectric member 313, also referred to as a "piezoelectric layer," is fabricated using various piezo materials, such as AlN, quartz, GaN, ZnO, lithium nobate, etc. A temperature compensating layer of oxide may be formed on top of piezoelectric layer 313, or any position in between the resonator stack. Terminals 324, 325 are in contact with upper electrode 311 and lower electrode 312 and thereby provide terminals for coupling MEMS acoustic wave resonator 300 to an oscillator circuit.

A distributed Bragg reflector (DBR) is a structure formed from multiple layers of alternating materials with varying acoustic impedance. Each layer boundary causes a partial reflection of a wave. For bulk acoustic waves whose wavelength is close to four times the thickness of the layers, the many reflections combine with constructive interference, and the layers act as a high-quality reflector. The example acoustic reflector 310 reduces acoustic energy leakage vertically into the MEMS substrate 301. In some examples, an additional acoustic reflector may be positioned on the sides and/or top of upper electrode 311. Any known or later developed Bragg mirror, dielectric mirror, acoustic reflector, etc. may be used to implement the acoustic reflector 310. The example acoustic reflector 310 includes alternating layers of materials with different acoustic impedances. In some examples, acoustic reflector 310 includes: (a) alternating flat conductive members (e.g., layers, sheets, plates, etc. of metal), two of which are designated by reference numerals 316 and 317; and (b) flat dielectric members (e.g., layers, sheets, plates, etc. of a dielectric material), two of which are designated by reference numerals 314 and 315. The thicknesses of and distances between the conductive members 315 and 314 are selected based on an intended resonance frequency of the BAW resonator 300. As a result, the acoustic reflector 310 reduces spurious modes, and it confines (such as by reflecting, directing, containing, etc.) acoustic energy of the main mode at that frequency in piezoelectric layer 313 and the two electrodes 311 and 312 which together act as a resonant cavity of the BAW resonator 300. In some examples, confining main mode acoustic energy refers to confining a portion of the main mode of acoustic energy. In this manner, the quality factor (Q) of the MEMS acoustic wave resonator 300 is increased and, in turn, the performance of a system including the example MEMS acoustic wave resonator 300 is improved. In some examples, the conductive members 316, 317 are formed by tungsten (W), titanium tungsten (TiW) or copper (Cu). In some examples, the dielectric members 314, 315 area formed by silicon dioxide (SiO2), or a carbon doped oxide dielectric (such as SiCOH), or aluminum nitride (AlN). In some examples, the acoustic reflector 310 may be implemented using a two-dimensional (2D) or a three-dimensional phononic crystal. Bottom electrode 312 may be formed in contact with the adjacent Bragg mirror 310.

The example MEMS substrate 301 that includes MEMS resonator 300 may be attached to another substrate 320 using a die attach material 321. Substrate 320 may be an integrated circuit (IC) die 320 that includes various semiconductor devices interconnected to perform one or more functions.

The example electrodes 311 and 312 may be electrically coupled with other components in an IC package and/or external components. In this example, bond wire 322 is bonded between bond pad 322 on MEMS substrate 301 that is connected to electrode 312 and bond pad 324 on IC die 320. Similarly, bond wire 326 is bonded between a bond pad 327 (see FIG. 7) that is connected to electrode 311 and bond pad 325. The electrode 311 and/or the electrode 312 may be electrically coupled to circuitry formed within epi layer 330, such as oscillator circuitry 101 (FIG. 1). The circuitry within epi layer 330 may include various types of circuits, such as a digital logic circuit, an analog circuit, a processor core, a digital signal processor (DSP) core, etc. In some examples, circuitry in epi layer 330 controls and/or uses a clock signal generated using the BAW resonator 300 to perform one or more functions, such as down conversion, up conversion, modulation, demodulation, etc. In some examples, BAW resonator 300 may be coupled with other acoustic resonators of different sizes and frequencies to form a filtering function.

IC die 320 may be attached to a lead frame or other substrate and then encapsulated, as described in more detail hereinbelow. IC die 320 and/or one or both electrodes 311, 312 may be electrically coupled to external contacts (not shown), such as contacts that may be provided by the lead frame or another substrate on which IC die 320 is mounted with bond wires.

Figure 4:
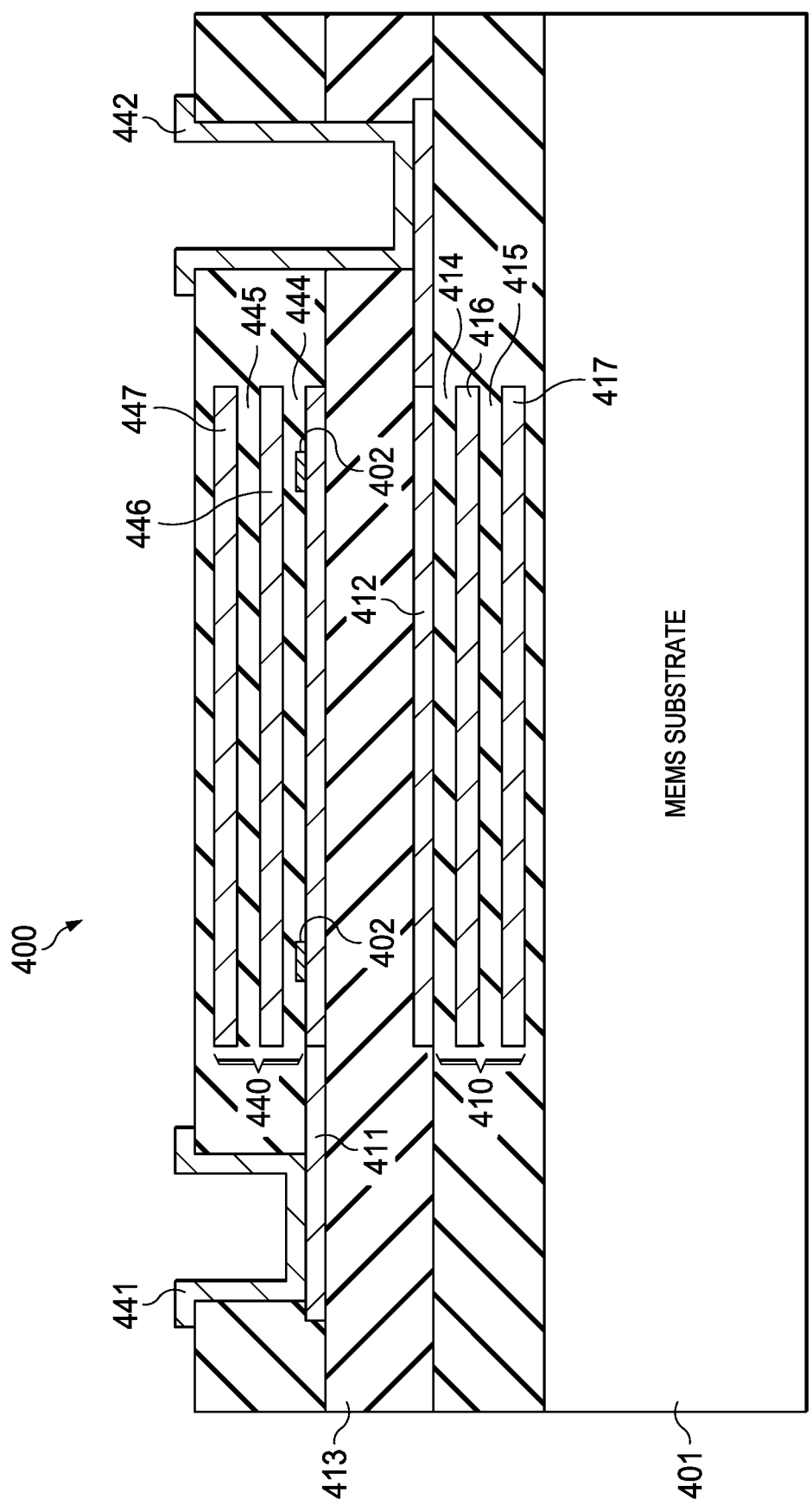
FIG. 4 is a cross sectional view of another example MEMS acoustic wave resonator device having a guard ring with a recessed space to the edge of the electrode.

FIG. 4 is a cross sectional view of another example MEMS acoustic wave resonator device having a guard ring 402 that encircles upper electrode 411 with a recessed space to the edge of the electrode 411. MEMS acoustic wave resonator 400 includes an upper electrode 411 and a lower electrode 412, which are separated by a piezoelectric member 413. MEMS resonator 400 may be fabricated directly on substrate 401 using known or later developed semiconductor fabrication techniques.

In this example, MEMS acoustic wave resonator 400 is a solidly mounted resonator that uses an acoustic reflector 410 at the bottom to prevent acoustic energy from leaking into MEMS substrate 401. A second acoustic reflector 440 located on top of upper electrode 411 prevents acoustic energy from leaking vertically from the top of MEMS acoustic wave resonator 400. In some examples, an additional acoustic reflector may be positioned on the sides of upper electrode 411.

In this example, electrodes 411, 412 and guard ring 402 are patterned from layers of metal, such as Al, Mo, Cu, Au, etc. A piezoelectric member 413 is positioned between the top electrode 411 and the bottom electrode 412. Piezoelectric layer 413 is fabricated using various piezo materials, such as AlN, quartz, GaN, ZnO, lithium nobate, etc. A temperature compensating layer of oxide may be formed on top of piezoelectric layer 413, or any position in between the resonator stack. Contacts 441, 442 are in contact with upper electrode 411 and lower electrode 412 respectively and thereby provide contacts for coupling MEMS acoustic wave resonator 400 to an oscillator circuit.

In this example, acoustic reflectors 410, 440 are DBR structures similar to acoustic reflector 310 (FIG. 3). In this example, acoustic reflector 410 includes alternating flat conductive members 416, 417 (e.g., layers, sheets, plates, etc. of metal) and flat dielectric members 414, 415 (e.g., layers, sheets, plates, etc. of a dielectric material). Acoustic reflector 440 includes alternating flat conductive members 446, 447 and flat dielectric members 444, 445. The thicknesses of and distances between the conductive members of acoustic reflectors 410, 440 are selected based on an intended resonance frequency of the BAW resonator 400. Any known or later developed Bragg mirror, dielectric mirror, acoustic reflector, etc. may be used to implement the acoustic reflectors 410, 440.

Figure 5:
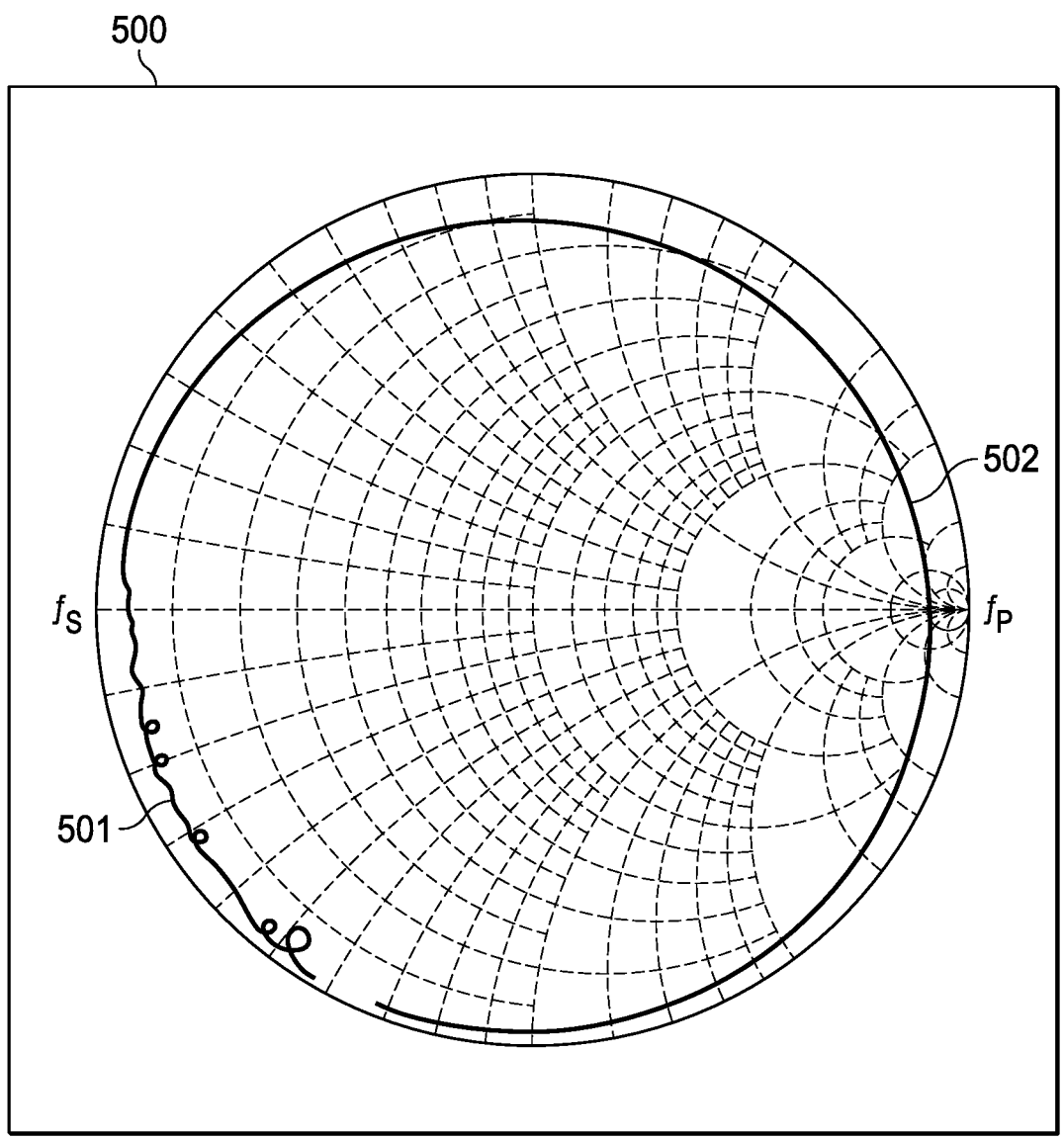
FIG. 5 is a Smith chart illustrating operation of the MEMS resonator device of FIG. 3.

FIG. 5 is a Smith chart 500 illustrating response of the MEMS acoustic wave resonator device 300 (FIG. 3). Experimental data demonstrates at 501 that spurious modes below the series resonant frequency fs are suppressed. There are no spurious modes between the series resonance fs and the parallel resonance fp as indicated by a smooth Smith circle in the region indicated at 502. If ripples were present on the Smith curve in the region of fp, they could cause variations in the Qp (quality factor around fp) and Zp (Impedance around fp).

Figure 6:
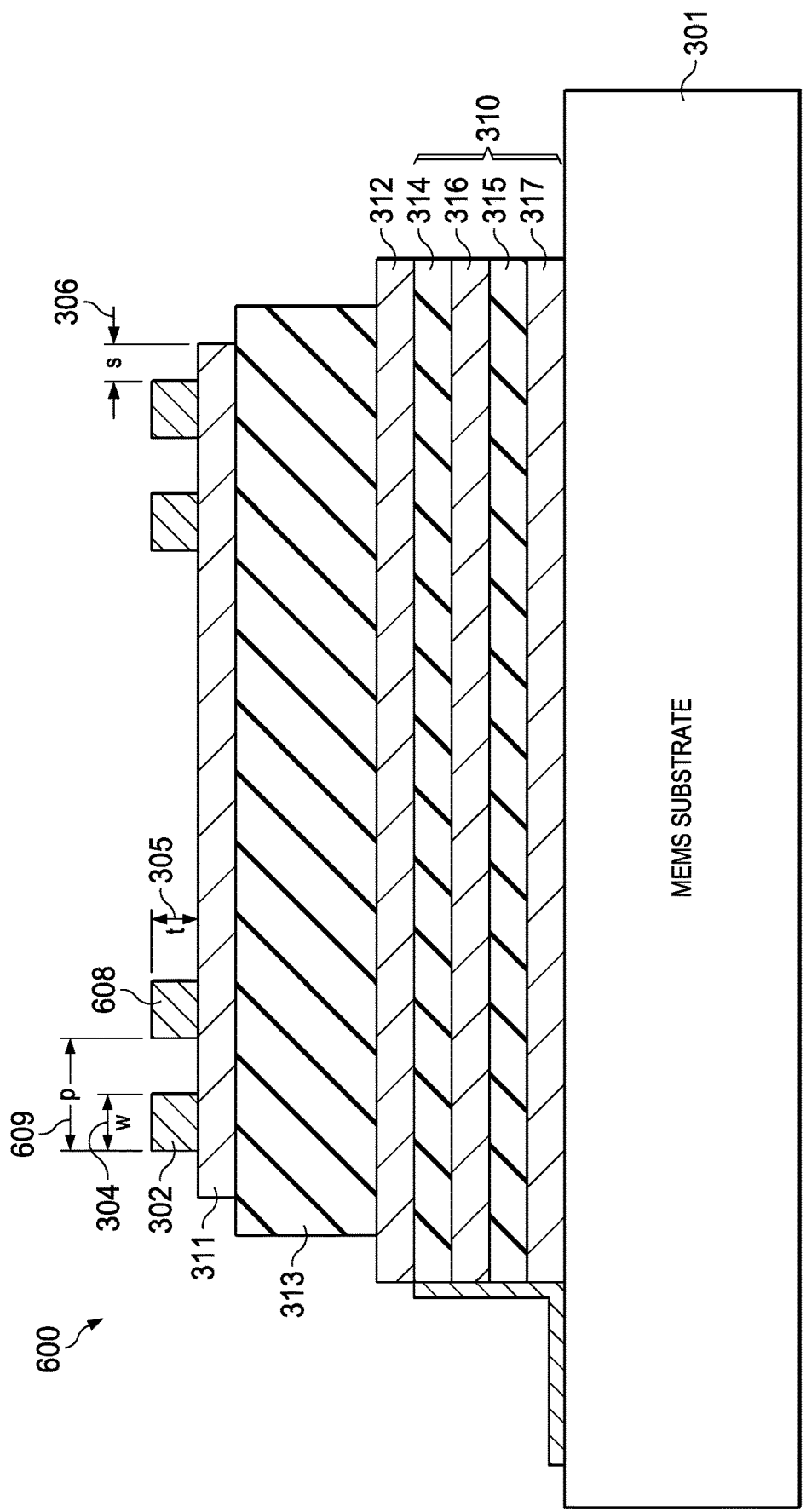
FIG. 6 is a cross sectional view of an example MEMS acoustic wave resonator device with periodic guard rings to create periodic recessed spaces.

FIG. 6 is a cross sectional view of an example MEMS acoustic wave resonator device 600 with periodic guard rings 302, 608. MEMS resonator device 600 is constructed in the same manner as MEMS resonator device 300 (FIG. 3). One or more additional guard rings 608 are fabricated on top of electrode 311. Each additional guard ring is spaced periodically by a periodic distance "p" 609. The guard ring width w, thickness t, space s to the edge, and the period p all affect the device performance.

Figure 7:
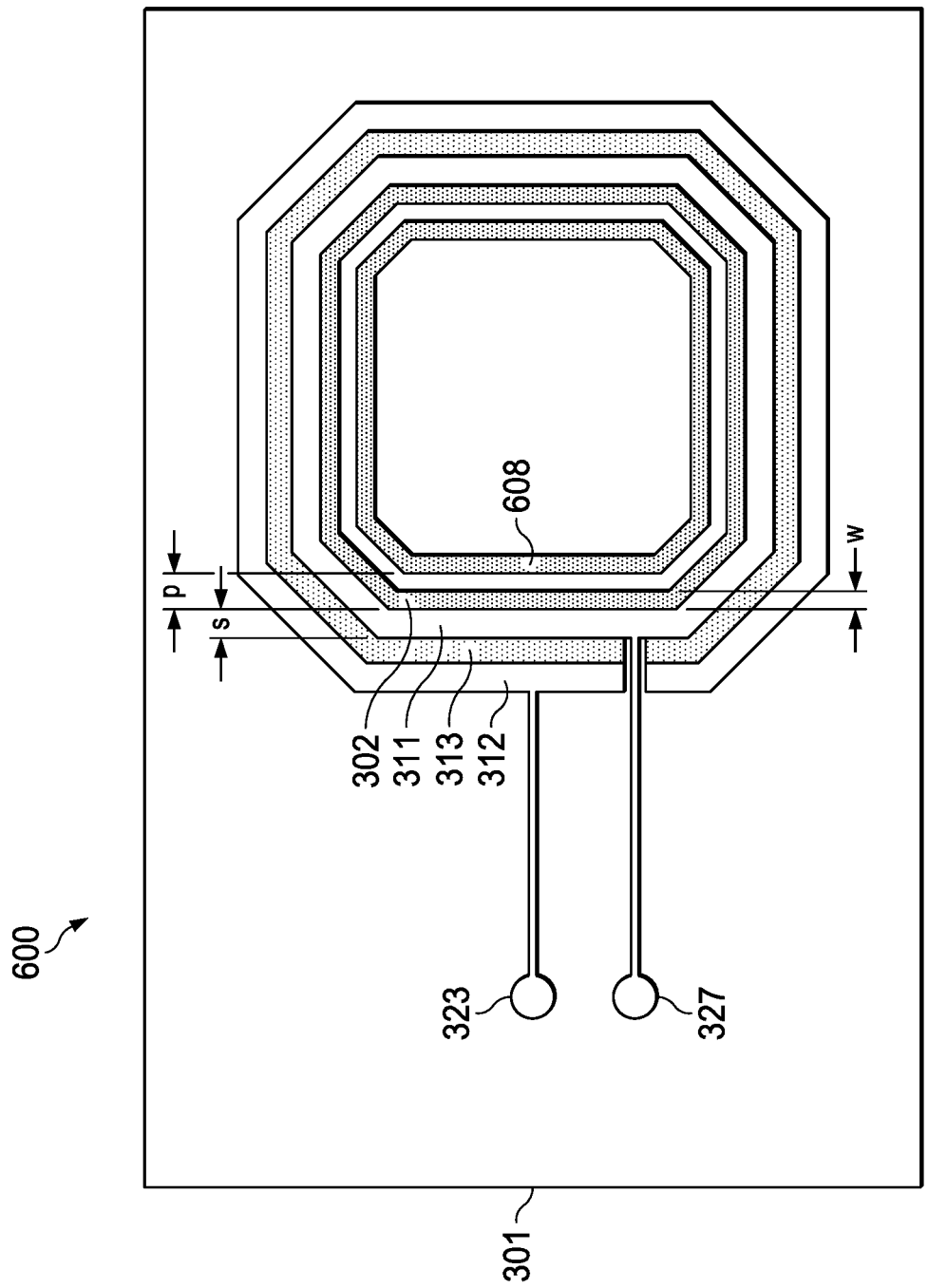
FIG. 7 is a top view of the example MEMS acoustic wave resonator device of FIG. 6.

FIG. 7 is a top view of the example MEMS acoustic wave resonator device 600 of FIG. 6. Guard ring 302 encircles the top electrode 311 and is set back from the perimeter edge of electrode 311 by a defined space to the edge s. The concentric periodically spaced guard ring 608 likewise encircles the top electrode but is placed within guard ring 302 and spaced at a periodic distance of p from guard ring 302. The top view of MEMS device 300 (FIG. 3) is similar but only has a single guard ring 302.

In some examples having two or more guard rings, the width of each guard ring will be the same; however, in some cases it may be determined that guard rings that have different widths provide better harmonic damping and thereby enhances the electrical performance of the BAW resonator.

Figure 8:
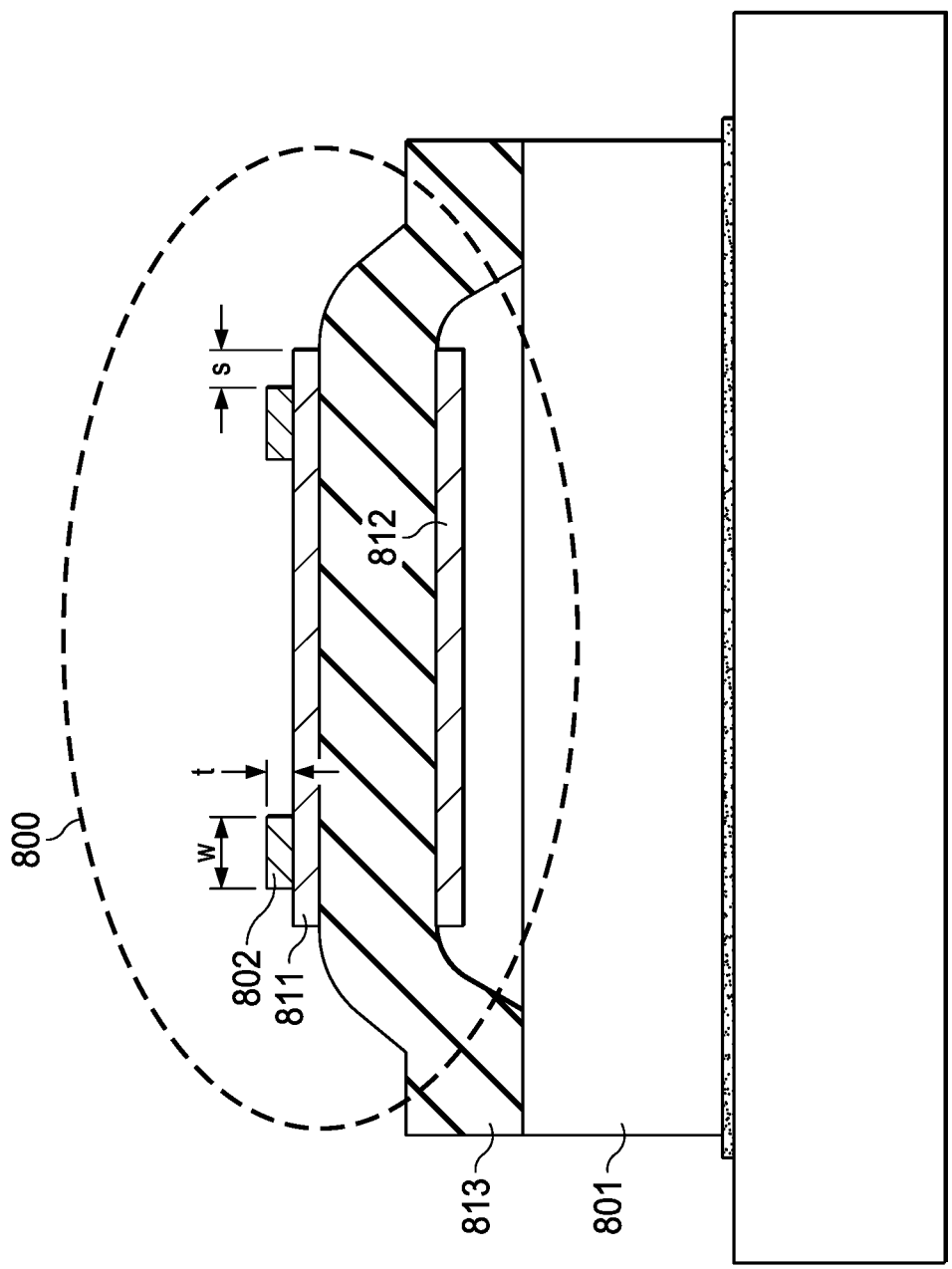
FIG. 8 is a cross section view another example MEMS resonator that is a fully released resonator structure.

FIG. 8 is a cross section view another example MEMS acoustic wave resonator 800 that is a fully released resonator structure. MEMS acoustic wave resonator 800 includes a piezoelectric member 813 with an electrode 812 formed on the bottom side and an electrode 811 formed on the top side. Piezoelectric layer 813 is formed on substrate 801 but is separated from substrate 801 in the active region of MEMS device 800 to allow the piezoelectric layer to vibrate freely. In this example, an acoustic reflector is not needed. Similar to MEMS device 300 (FIG. 3), a guard ring 802 encircles top electrode 811 spaced back from the perimeter edge by a distance s. Guard ring 802 has a thickness t and a width w. The guard ring width w, thickness t, and space to the edge s all affect the device performance.

Figure 9:
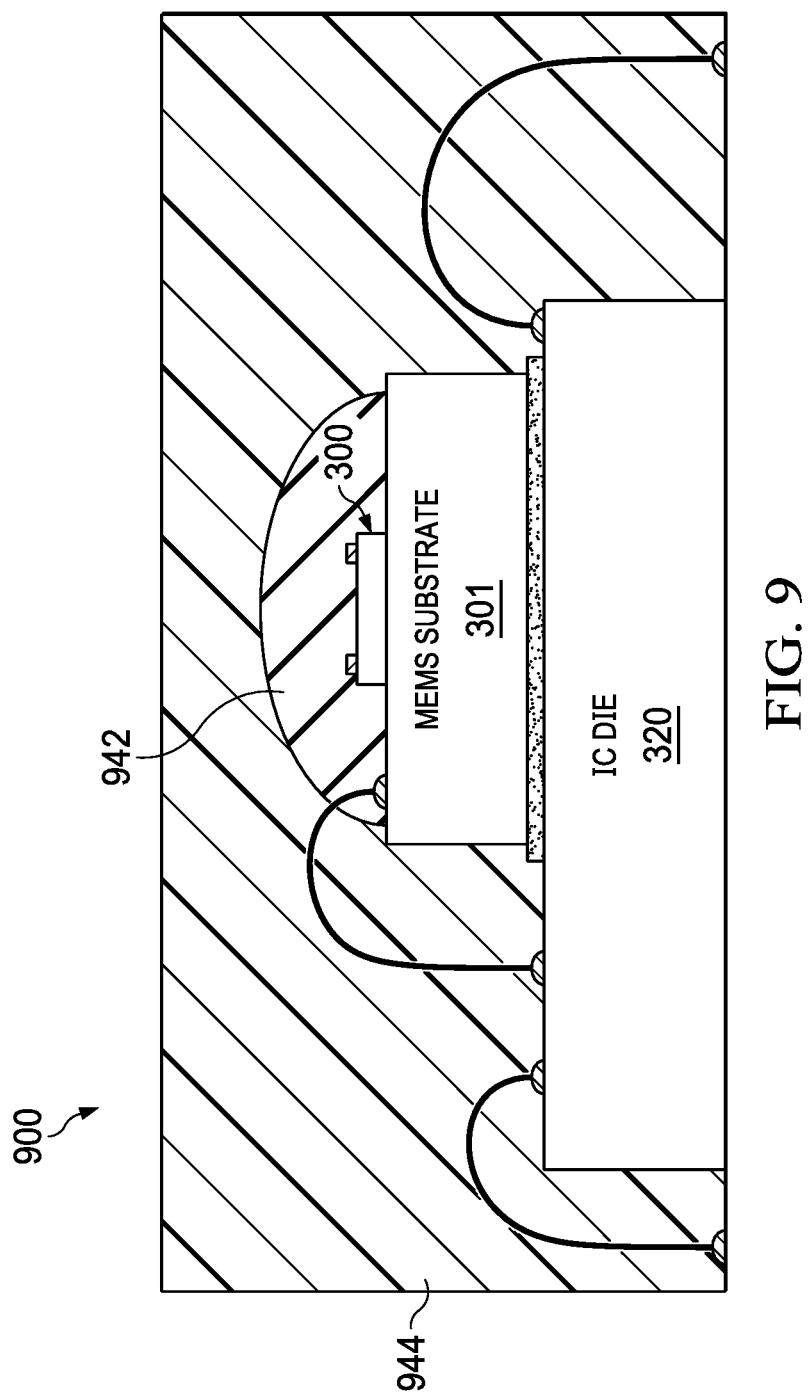
FIG. 9 is a cross sectional view of an example package integrated circuit that includes the example MEMS acoustic wave resonator of FIG. 3.

FIG. 9 is a cross sectional view of an example package integrated circuit 900 that includes the example MEMS resonator 300 of FIG. 3. In this example, a material 942 that has a low modulus of elasticity may be placed over MEMS resonator 300 to prevent high modulus mold compound from touching BAW resonator 300. IC die 320 and MEMS die 301 is encapsulated with mold compound 944, using a known or later developed encapsulation process.

In this manner, low modulus material 942 acts as a stress buffer and provides a stress-free structure for BAW resonator 300 within an encapsulated package 940.

In another example, a protective "cavity wafer" or "hard hat" may be placed over MEMS acoustic wave resonator 300 to prevent mold compound from touching MEMS acoustic wave resonator 300. IC die 320 and MEMS die 301 may then be encapsulated with mold compound using a known or later developed encapsulation process.

Other examples of MEMS resonators, such as MEMS resonator 400 of FIG. 4, MEMS resonator 600 of FIG. 6, or MEMS resonator 800 of FIG. 8, may be encapsulated in a similar manner.

Figure 10:
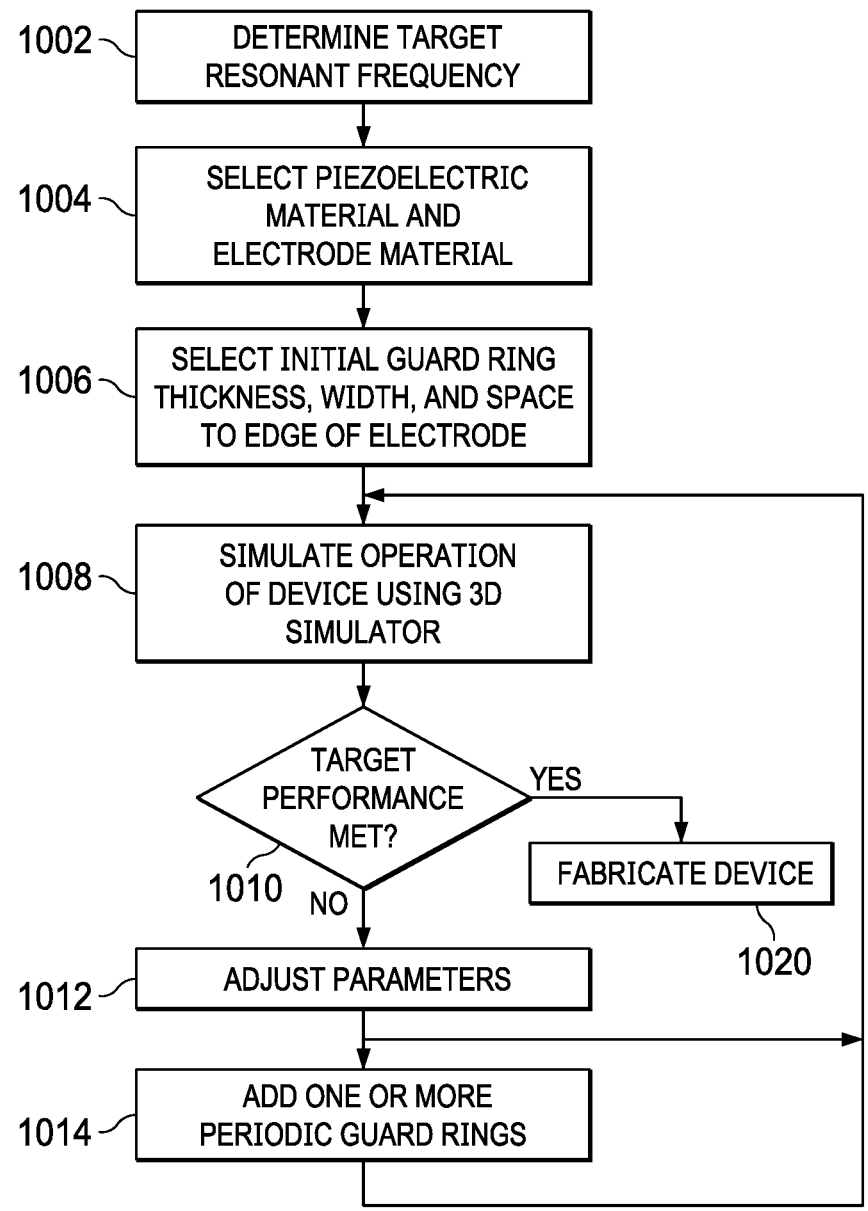
FIG. 10 is a flow chart illustrating design of a MEMS resonator device.

FIG. 10 is a flow chart illustrating design of a MEMS resonator device, such as any of the MEMS devices 300, 600, 800 described hereinabove. As discussed herein above, with a typical perimeter guard ring, spurious modes still exist around the parallel resonance frequency fp, as illustrated by ripples in the Smith charts of FIG. 2. The existence of these ripples in the vicinity of parallel resonance frequency fp is undesirable in many applications. Any ripples around the parallel resonance can cause the Qp (quality factor around fp) and Zp (Impedance around fp) to vary and thus may cause variation in the system performance. By spacing a guard ring away from the perimeter edge of the top electrode, ripple and spurious modes around the parallel resonance frequency (fp) are minimized. This configuration allows a Type II BAW resonator to eliminate lateral standing Lamb waves in the active area of the resonator. When correct dimensions for guard ring width w, thickness t, and space s to the edge of the electrode are implemented, this guard ring configuration has a lower cut-off frequency to fulfill the boundary condition required to have piston mode operation. In piston mode operation, the whole active area of the BAW structure vibrates in phase to present a flat distribution of mechanical displacements across the entire active area. Resonances occurring near the piston mode operation frequency are therefore often weakly coupled, which enhances the electrical performance of the BAW resonator.

At 1002, a designer first selects a target resonant frequency for a MEMS device. MEMS resonator devices using piezoelectric films with thicknesses ranging from several micrometers down to tenth of micrometers resonate in the frequency range of roughly 100 MHz to 10 GHz.

At 1004, a designer selects what materials will be used to fabricate the piezoelectric layer, electrodes, and acoustic reflector. Aluminum nitride and zinc oxide are two common piezoelectric materials used in MEMS resonators. In some examples, the conductive members are formed by tungsten (W), titanium tungsten (TiW) or copper (Cu). In some examples, the dielectric members are formed by silicon dioxide ($SiO_2$), or a carbon doped oxide dielectric (such as SiCOH), or aluminum nitride (AlN).

At 1006, an initial guard ring thickness, width and space to the edge of the electrode are selected. Typically, the width of the guard ring is about a quarter wavelength of the target resonant frequency.

At 1008, operation of the pending MEMS device design is simulated using a two dimensional (2D) or three dimensional (3D) finite element simulator. A BAW resonator presents lateral standing waves which degrades its electrical performance. 2D/3D simulations are needed to predict the allocation and the effect of these lateral modes. Several known or later developed 2D/3D finite element simulator are available for this task.

At 1010, a check is made after simulation of the pending MEMS device design to determine if target performance requirements are met. This may be done using a Smiths chart to plot the frequency response of the simulated MEMS device design, such as Smith chart 500 in FIG. 5. Another way to determine if target performance requirements are met is to determine if the simulated MEMS resonator is operating in piston mode. In piston mode operation, the whole active area of the BAW structure vibrates in phase to present a flat distribution of mechanical displacements across the entire active area. Resonances occurring near the piston mode operation frequency are therefore often weakly coupled, which enhances the electrical performance of the BAW resonator.

At 1012, if the target performance parameters are not met by the pending design, the designer may adjust the guard ring thickness, width, and space to the edge of the top electrode and repeat the simulation at 1008 using the adjusted parameters. This loop may be repeated several times with various combinations of guard ring parameters.

At 1014, one or more periodically spaced guard rings may be added to the design. Repeated simulations and adjustments of parameters may be done at 1008, 1010, 1012 until an acceptable design is determined.

At 1020, a design that meets target performance goals may then be fabricated using known or later developed semiconductor processing techniques with the parameters determined using this process.

In one example MEMS device designed to operate at 2.5 GHz, the following ranges of guard ring parameters provide acceptable performance: thickness 800 nm +/−20%, width 6+/−20%, um, space to edge 2 um +/−20%. Devices designed to operate at a higher or at a lower target frequency will have guard ring parameters selected to match the target frequency.

Other Embodiments

In described examples, a single MEMS acoustic wave resonator is mounted on a substrate, but in other examples there may be two or more MEMS resonators mounted on one or more substrates.

In some examples that include two or more concentric periodically spaced guard rings, the outer edge of the outer guard ring may be positioned even with the edge of the top electrode.

In described examples, the upper electrode is essentially round. In other examples, the upper electrode may be square, rectangular, or any polygon shape. Irregular polygon layouts help to suppress spurious modes.

The example IC package 900 of FIG. 9 is a surface mount device with a plurality of contacts on a bottom side of the package. However, in other examples, the IC package may be any of a number of known or later developed configurations, and may have various form, material(s), shapes, dimension(s), number of contacts, shape of contacts, etc. Moreover, the MEMS acoustic wave resonator(s) and/or any other components may be packaged, mounted, etc. in the IC package in various configurations. Other example IC packages may be, for example, a wafer-level package or a die-level package.

Many devices are encapsulated with an epoxy plastic that provides adequate protection of the semiconductor devices and mechanical strength to support the leads and handling of the package. Some integrated circuits have no-lead packages such as quad-flat no-leads (QFN) and dual-flat no-leads (DFN) devices that physically and electrically couple integrated circuits to printed circuit boards. Flat no-lead devices, also known as micro leadframe (MLF) and small outline no-leads (SON) devices, are based on a surface-mount technology that connects integrated circuits to the surfaces of printed circuit boards without through-holes in the printed circuit boards. Perimeter lands on the package provide electrical coupling to the printed circuit board. Another example may include packages that are entirely encased in mold compound, such as a dual inline package (DIP).

In another example, the MEMS device may be fabricated using an additive manufacturing process. Additive manufacturing has enabled the deposition of patterned materials in a rapid and cost-efficient manner. Additive manufacturing processes are now being used in several areas. The International Association for Testing Materials (ASTM) has now promulgated ASTM F7292-12a "Standard Terminology for Additive Manufacturing Technologies" 2012 which is incorporated by reference herein. Currently, there are seven families of additive manufacturing processes according to the ASTM F2792 standard, including: vat photopolymerization, powder bed fusion, binder jetting, material jetting, sheet lamination, material extrusion, directed energy deposition. Hybrid processes may combine one or more of these seven basic processes with other manufacturing processes for additional processing flexibility. Recent process advances allow additive manufacturing of 3D structures that have feature resolution of less than 100 nm, such as direct laser lithography, multi-photon lithograph, two-photon polymerization, etc.

In this description, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

The invention claimed is:

1. A micromechanical system (MEMS) resonator comprising:
   a base substrate;
   a piezoelectric member mounted on the base substrate, the piezoelectric member having a first electrode attached to a first surface of the piezoelectric member and a second electrode attached to a second surface of the piezoelectric member opposite the first electrode, the second electrode being bounded by a perimeter edge; and
   a guard ring attached to the second electrode spaced apart from the perimeter edge of the second electrode.

2. The MEMS resonator of claim 1, wherein the guard ring is a first guard ring, further comprising a second guard ring attached to the second electrode, wherein the second guard ring is concentric with and surrounded by the first guard ring and spaced periodically from the first guard ring.

3. The MEMS resonator of claim 1, wherein the MEMS resonator is a thin film bulk acoustic resonator.

4. The MEMS resonator of claim 1, wherein the MEMS resonator is a solidly mounted resonator.

5. The MEMS resonator of claim 1, further comprising an acoustic reflector attached to the first electrode.

6. The MEMS resonator of claim 5, further comprising another acoustic reflector attached to the second electrode.

7. The MEMS resonator of claim 1, wherein the guard ring has a width having a range of 5-7 um and wherein the guard ring is spaced apart from the perimeter edge of the second electrode by a space having a range of 1.6-2.4 um.

8. The MEMS resonator of claim 2, wherein the first guard ring has a thickness and a width, and the second guard ring has the same thickness and the same width as the first guard ring.

9. The MEMS resonator of claim 2, wherein the first guard ring has a thickness and a width, and the second guard ring has width that is different from the width of the first guard ring.

10. The MEMS resonator of claim 1, wherein the first guard ring is a dielectric material.

11. A micromechanical system (MEMS) resonator comprising:
    a base substrate;
    a piezoelectric member mounted on the base substrate, the piezoelectric member having a first electrode attached to a first surface of the piezoelectric member and a second electrode attached to a second surface of the piezoelectric member opposite the first electrode, the second electrode being bounded by a perimeter edge;
    a first guard ring positioned on the second electrode adjacent to the perimeter edge of the second electrode; and
    a second guard ring positioned on the second electrode, wherein the second guard ring is concentric with and surrounded by the first guard ring and spaced periodically from the first guard ring.

12. The MEMS resonator of claim 11, wherein the first guard ring has a thickness and a width, and the second guard ring has the same thickness and the same width as the first guard ring.

13. The MEMS resonator of claim 11, wherein the first guard ring has a thickness and a width, and the second guard ring has a width that is different from the width of the first guard ring.

14. The MEMS resonator of claim 11, wherein the MEMS resonator is a thin film bulk acoustic resonator.

15. The MEMS resonator of claim 11, wherein the MEMS resonator is a solidly mounted resonator.

16. The MEMS resonator of claim 11, further comprising an acoustic reflector attached to the first electrode.

17. The MEMS resonator of claim 11, further comprising another acoustic reflector attached to the second electrode.

18. A method for designing a micromechanical system (MEMS) resonator, the method comprising:
    selecting a piezoelectric material and material for a top electrode and bottom electrode for a simulated MEMS resonator;
    selecting an initial thickness and width for a guard ring placed on the top electrode, and selecting a space to a perimeter edge of the top electrode from the outside edge of the guard ring;
    simulating operation of the simulated MEMS resonator using a three-dimensional finite element simulator; and
    adjusting the thickness, width and space to the perimeter edge and repeating simulating operation of the simulated MEMS resonator.

19. The method of claim 18, further comprising adjusting the thickness, width and space to the perimeter edge and repeating simulating operation of the simulated MEMS resonator until the simulated MEMS resonator operates in piston mode.

20. The method of claim 18, further comprising adjusting the thickness, width and space to the perimeter edge and repeating simulating operation of the simulated MEMS resonator until variation in impedance of the simulated MEMS resonator around a selected parallel resonance frequency is less than a selected threshold value.

* * * * *